United States Patent [19]
Nikitsch et al.

[11] 3,852,792
[45] Dec. 3, 1974

[54] PHOTOGRAPHIC APPARATUS

[75] Inventors: Erhard Nikitsch; Johann Putscher, both of Munich; Peter Utschig, Unterhaching, all of Germany

[73] Assignee: Agfa-Gevaert Aktiengesellschaft, Leverkusen, Germany

[22] Filed: Aug. 23, 1973

[21] Appl. No.: 390,922

[30] Foreign Application Priority Data
Aug. 29, 1972 Germany............................ 2242364

[52] U.S. Cl................................. 354/213, 354/206
[51] Int. Cl....... G03b 1/62, G03b 19/04, G03b 1/14
[58] Field of Search ......... 95/31 FM, 31 FL, 31 AC

[56] References Cited
UNITED STATES PATENTS
| | | | |
|---|---|---|---|
| 3,605,595 | 9/1971 | Irwin | 95/31 FM |
| 3,633,477 | 1/1972 | Hackenberg et al. | 95/11 R |
| 3,736,854 | 6/1973 | Beach | 95/31 FM |

Primary Examiner—Robert P. Greiner
Attorney, Agent, or Firm—Michael S. Striker

[57] ABSTRACT

A still camera for use with roll film which is adjacent to a web of backing paper and has a row of perforations, one for each film frame. When the film is being transported from a supply reel to a takeup reel, a feeler engages the film and penetrates an oncoming perforation to be thereupon entrained by the film through a predetermined distance which suffices to move a pawl from a first to a second position whereby the pawl interrupts the transport of film at the exact moment when the foremost unexposed film frame is in register with the picture taking lens. The feeler can move the pawl by way of a lever which is biased by a spring and has two notches and a cam face between the two notches. The feeler has a follower which extends into the first notch while the feeler enters an oncoming perforation and which moves along the cam face to enter the second notch while the feeler is being entrained by the film. The follower causes the lever to move the pawl to the second position not later than when the follower enters the second notch. At the same time, the lever causes the feeler to pivot to a position in which the feeler extends with clearance through the adjacent perforation and bears against the backing paper.

11 Claims, 2 Drawing Figures

PATENTED DEC 3 1974 3,852,792

PHOTOGRAPHIC APPARATUS

BACKGROUND OF THE INVENTION

The present invention relates to photographic apparatus in general, especially to still cameras, and more particularly to improvements in photographic apparatus for use with roll film having a row of perforations, one for each film frame, and with a web of backing paper for the film. Still more particularly, the invention relates to improvements in means for automatically terminating the transport of film when the foremost unexposed film frame registers with the picture taking lens.

It is already known to provide in a still camera a feeler which bears against the film and penetrates into an oncoming perforation to thereby interrupt the transport of film at the exact moment when the foremost unexposed film frame registers with the picture taking lens. A drawback of such photographic apparatus is that the feeler engages the film during the making of exposures which can result in some shifting of the film. Moreover, the film is likely to be damaged in the region of its perforations if the feeler is to constitute a stop which prevents the user from further advancing the film after the feeler has entered an oncoming perforation.

SUMMARY OF THE INVENTION

An object of the invention is to provide a photographic apparatus (especially a still camera for use with roll film which is provided with a row of perforations, one for each film frame, and is movable lengthwise together with a web of backing paper) with novel and improved metering means for automatically interrupting the transport of film when the foremost unexposed film frame registers with the picture taking lens.

Another object of the invention is to provide a photographic apparatus, especially for use with film which is stored in a container in the form of a cartridge, cassette or the like, with a novel and improved feeler which does not stress the film during picture taking and which is capable of holding the backing paper against movement relative to the film while the user makes an exposure.

A further object of the invention is to provide in a photographic apparatus of the just outlined character a novel and improved connection between the film transporting mechanism and the feeler which tracks the film and penetrates into oncoming perforations to thereby initiate the termination of film transport.

An additional object of the invention is to provide novel and improved means for moving the feeler independently of the film.

The invention is embodied in a photographic apparatus for use with roll film having a row of perforations, one for each film frame, and with a web of backing paper which is adjacent to one side of the film. The film and backing paper may be confined in a magazine or cassette. The apparatus comprises film transporting means which is operable by a lever, wheel or the like to advance the film and backing paper along a predetermined path, a movable feeler which is adjacent to the path opposite the backing paper and is in register with the row of perforations, biasing means for urging the feeler against the film in the path so that the feeler automatically enters an oncoming perforation of the film and is thereupon entrained by the moving film, control means (e.g., a member in the form of a two-armed pawl or lever) which is movable between first and second positions in which it respectively permits and effects an interruption of film transport along the aforementioned path, and a displaceable motion transmitting device (e.g., a two-armed lever) which receives motion from the feeler while the latter is being entrained by the film. The motion transmitting device then effects the movement of control means from the first to the second position and simultaneously disengages the feeler from the film so that the feeler extends with clearance through the adjacent perforation and bears against the backing paper.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
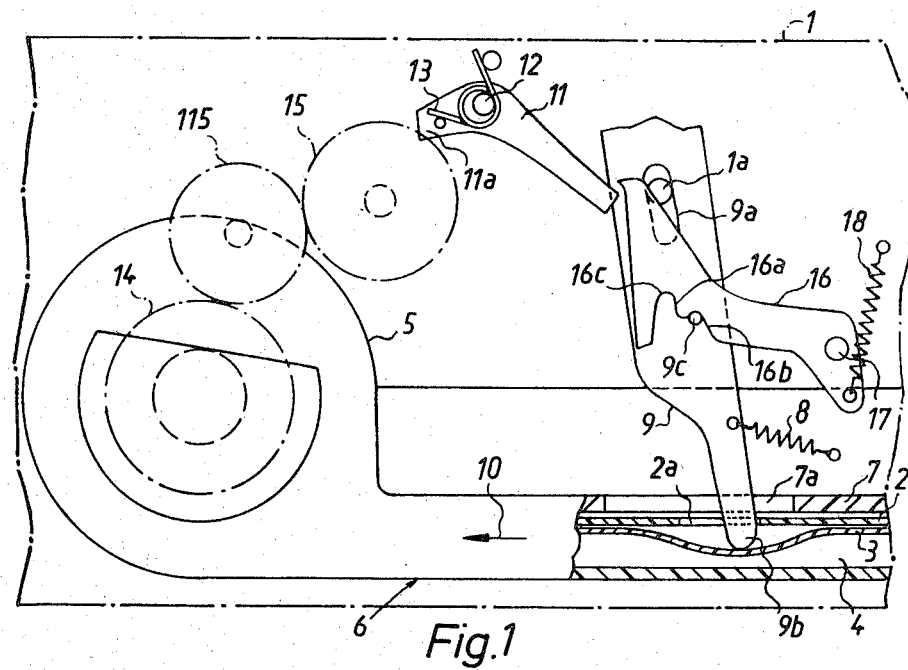
FIG. 1 is an enlarged fragmentary horizontal sectional view of a still camera which embodies the invention, the scanning portion of the feeler being shown in a position it assumes immediately after penetration into the adjacent perforation but prior to completed transport of film by the length of a frame.

Referring first to FIG. 1, there is shown a portion of a still camera which comprises a housing or body 1 having a chamber for reception of a removable container or cassette 6 for photographic roll film 2 and backing paper 3. The cassette 6 comprises a supply section (not shown) which contains a first reel or spool for unexposed frames of the film 2, a takeup section 5 which is preferably mirror symmetrical to the supply section and contains a takeup reel 14 for collection of exposed frames of film 2, and an intermediate section 7 which defines an elongated path 4 along which the film 2 and backing paper 3 move during transport in the direction indicated by an arrow 10. The film 2 has a row of perforations 2a (only one shown), one for each film frame. The intermediate section 7 of the cassette 6 is provided with a customary window (not shown) which registers with the picture taking lens (not shown) and with the foremost unexposed film frame so that such frame can be exposed to scene light in response to opening of the shutter, i.e., in response to actuation of the camera release.

The housing 1 comprises a stationary pin 1a for a pivotable and reciprocable feeler 9 having an elongated slot 9a for the pin 1a and a scanning portion or arm 9b which is biased against the adjacent side of the film 2 by a helical spring 8. The feeler 9 is mounted opposite the backing paper 3 and its scanning portion 9b extends through a slot 7a of the intermediate section 7 of the cassette. The length of the slot 7a is sufficient to enable the scanning portion 9b to move in the direction indicated by the arrow 10 when its tip enters an oncoming perforation 2a and is thus entrained by the film 2 while the film continues to advance toward the takeup reel 14. It will be noted that the scanning portion 9b is aligned with the row of perforations 2a so that it automatically penetrates into an oncoming perforation when the customary lever or wheel of actuating means including the film transporting mechanism is pivoted or rotated in order to advance the film 2 along the path 4 so that the film moves from the reel of the supply section toward the reel 14 of the takeup section 5 of the cassette 6.

Figure 2:
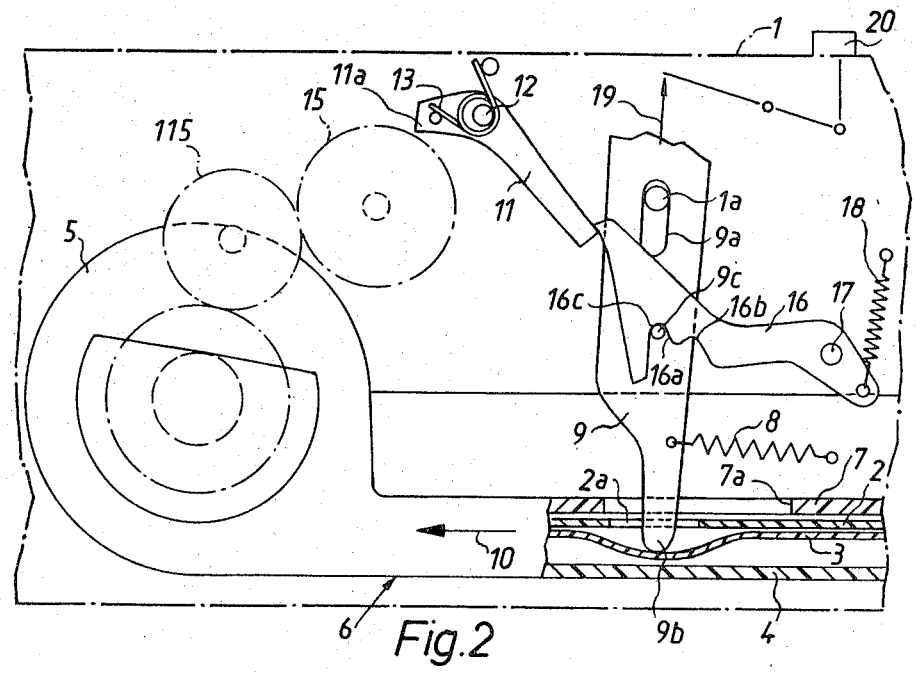
FIG. 2 is a similar view but showing the feeler in a position it assumes upon completion of the transport of film by the length of a frame.

The housing 1 further comprises a pivot member 12 for a control pawl 11 which is biased counterclockwise by a torsion spring 13. The pawl 11 resembles a two-armed lever and is movable about the axis of the pivot member 12 between a first position shown in FIG. 1 (in which it allows the film transporting mechanism to advance the film 2 and the backing paper 3 in the direction indicated by arrow 10) and a second position which is shown in FIG. 2 and in which the pawl 11 effects a termination of film transport toward the takeup reel 14 because the pawl 11 is allowed or caused to assume the position of FIG. 2 in response to completed transport of the film by the length of a frame. The arrangement is such that the pawl 11 moves to the second position of FIG. 2 in response to entrainment of the scanning portion 9b by the film 2, i.e., after the scanning portion 9b has entered the oncoming perforation 2a.

The film transporting mechanism of the camera shown in FIGS. 1 and 2 comprises a gear train including a gear 15 which can be rotated in response to pivoting of the aforementioned lever or in response to rotation of the aforementioned wheel, and a gear 115 which meshes with the gear 15 and with a gear which drives the takeup reel 14 in a clockwise direction, i.e., in a direction to collect the exposed frames of film 2 and the corresponding portions of the backing paper 3.

The control pawl 11 can terminate the transport of film 2 and backing paper 3 in any one of a number of conventional ways. In accordance with a first known proposal (which is not shown in the drawing), the pawl 11 moves its pallet 11a into engagement with the adjacent teeth of the gear 15 when the feeler 9 assumes the position shown in FIG. 2 whereby the pallet 11a holds the gear 15 against further rotation in a clockwise direction. Thus, the first proposal provides that the pawl 11 be disengaged from the film transporting mechanism while the film 2 is in motion (in the direction indicated by the arrow 10) and that the pallet 11a engage the film transporting mechanism (i.e., the gear 15) only when the transport of film 2 by the length of a frame is completed. The pallet 11a is automatically disengaged from the gear 15 when the user of the camera actuates the camera release to open the shutter and to thereby expose that film frame which is located behind the picture taking lens.

In accordance with a second proposal which is shown in the drawing, the pawl 11 assumes the first position of FIG. 1 while the film transporting mechanism rotates the takeup reel 14 in a clockwise direction, and the pallet 11a becomes disengaged from the gear 15 when the transport of film 2 by the length of a frame is completed. This necessitates the provision of a modified film transporting mechanism forming part of an actuating means or transmission which operates in two stages.

During the first stage, the aforementioned lever or wheel is pivoted or rotated to transport the film 2 by rotating th takeup reel 14 in a clockwise direction. The lever or wheel constitutes the input element of the actuating means and the gears 15, 115 form part of a first ouput member of such actuating means. When the transport of film 2 by the length of a frame is completed, the pawl 11 moves from the first position of FIG. 1 to the second position of FIG. 2 to thereby interrupt the operative connection between the input member and the first output member of the actuating means and to simultaneously establish an operative connection between the input member and a second output member which serves to perform another function, e.g., to cock the shutter. Consequently, the first stage of pivoting or rotation of the input member results in transport of the film by the length of a frame and the second stage of pivoting or rotation of the input member results in cocking of the shutter while the first output member (i.e., the film transporting mechanism) is idle. The manner in which the pivotal movement of pawl 11 from the first position of FIG. 1 to the second position of FIG. 2 results in an interruption of operative connection between the input member and the first output member of the actuating means and simultaneously effects the establishment of an operative connection between the input member and the second output member of the actuating means is not shown because it is disclosed in a copending application owned by the assignee of the present case and also because it has no direct bearing on the present invention a feature of which resides in the provision of a motion transmitting lever 16 cooperating with the feeler 9 and with the pawl 11 to change the position of the feeler 9 in response to entrainment of the scanning portion 9b by the film 2 and to move the pawl 11 from the first position of FIG. 1 to the second position of FIG. 2 so that the pawl 11 effects a termination of the transport of film 2 and backing paper 3. It is to be noted that, during normal transport of film 2 by the length of a frame, the convolutions consisting of exposed frames of film 2 are tightly packed around the core of the takeup reel 14 so that there is no clockspringing or recoiling when the pallet 11a is disengaged from the gear 15.

The feeler 9 is provided with a post 9c which constitutes a follower and can track a cam face 16a of the motion transmitting lever 16. The cam face 16a is located between two recesses or notches 16b, 16c. The relatively shallow notch 16b receives the follower 9c when the feeler 9 assumes the position of FIG. 1, and the relatively deep notch 16c receives the follower 9c when the feeler 9 assumes the position of FIG. 2. The lever 16 is pivotable on a pin 17 which is fixedly mounted in the housing 1. A helical spring 18 biases the lever 16 in a counterclockwise direction, as viewed in FIG. 1 or 2. The tip of the longer arm of the lever 16 engages the longer arm of the pawl 11 and disengages the pallet 11a from the gear 15 when the lever 16 pivots in a counterclockwise direction. The spring 18 not only tends to pivot the lever 16 in a counterclockwise direction but it also tends to move the feeeler 9 downwardly, as viewed in FIG. 1 or 2, i.e., in a direction to cause the scanning portion 9 b to penetrate deeper into the adjacent perforation 2a and to bear against the backing paper 3. When the feeler 9 assumes a position in which its scanning portion 9b engages the upper side of the film 2 (as viewed in FIG. 1) while the film 2 advances so that a perforation 2a approaches the tip of the scanning portion 9b, the feeler 9 bears against the film under the combined action of the springs 8 and 18. When the oncoming perforation 2a reaches the tip of the scanning portion 9b, the latter moves to the position shown in FIG. 1 and is entrained by that portion of film 2 which is located to the right of the perforation 2a, as viewed in FIG. 1. The penetration of scanning portion 9b into a perforation 2a results in tensioning of the backing paper 3 which thereby opposes further penetration of scanning portion 9a into the perforation.

The operation is as follows:

The scanning portion 9b of the feeler 9 is retracted from the adjacent perforation 2a in response to actuation of the camera release 20. After the making of an exposure is completed, the user must advance the film 2 by the length of a frame so as to place the foremost unexposed film frame into register with the picture taking lens. During such transport, the scanning portion 9b bears against the front side of the film 2 (i.e., against that side which faces away from the backing paper 3) and enters the oncoming perforation 2a under the action of the springs 8 and 18. The follower 9c remains in the notch 16b while the scanning portion 9b enters the perforation 2a because the lever 16 turns counterclockwise about the axis of the pivot pin 17 since it is biased by the spring 18. The film 2 continues to move in the direction indicated by the arrow 10 so that it entrains the scanning portion 9b and pivots the feeler 9 in a clockwise direction to thereby stress the spring 8. The follower 9c rides along the cam face 16a and thereupon enters the notch 16c. This enables the spring 18 to pivot the lever 16 through an angle which is necessary to disengage the pallet 11a of the control pawl 11 from the gear 15 and to thus effect a termination of film transport. Further pivoting or rotation of the input member of the actuating means then results in cocking of the shutter while the film transporting mechanism is at a standstill.

When the follower 9c reaches the crest of the cam face 16a between the notches 16b, 16c (i.e., while the feeler 9 is being pivoted by the film 2), the spring 18 is allowed to contract abruptly and the cam face 16a pivots the feeler 9 clockwise so that the scanning portion 9b is disengaged from the film 2 and its tip bears with a greater force against the backing paper 3. Thus, the scanning portion 9b is then received in the perforation 2a with a certain amount of clearance so that the feeler 9 does not tension the film 2 during the making of an exposure. Moreover, the frictional engagement between the backing paper 3 and the rounded tip of the scanning portion 3 indirectly fixes the film 2 in a position in which the foremost unexposed film frame is in accurate register with the picture taking lens. The scanning portion 9b then holds the backing paper 3 against any movement along or transversely of the path 4.

When the making of the exposure is completed, the scanning portion 9b of the feeler 9 is already withdrawn from the perforation 2a because such withdrawal takes place in automatic response to actuation of the camera release 20. This is illustrated symbolically in FIG. 2 wherein the arrow 19 indicates the direction of movement of the feeler 9 in response to actuation of the camera release 20. The motion transmitting lever 16 is also returned to its starting position in which the follower 9c extends into the shallower notch 16b. The tip of the scanning portion 9b is moved out of register with the adjacent perforation 2a as soon as the scanning portion 9b is withdrawn from such perforation. This will be readily understood since the spring 8 contracts and pivots the feeler 9 counterclockwise as soon as the tip of the scanning portion 9b rises above the upper side of the film 2. The return movement of follower 9c from the notch 16c into the notch 16b takes place under the action of the spring 8 while the feeler 9 pivots counterclockwise upon completed withdrawal of its scanning portion 9b from the adjacent perforation 2a. As the lever 16 returns to starting position, its longer arm moves away from the longer arm of the pawl 11 so that the torsion spring 13 is free to return the pallet 11a into engagement with the gear 15. The actuating means is then ready to be operated, i.e., the user can pivot or rotate the input member which causes the film transporting mechanism to advance the film 2 by the length of a frame and the input member thereupon causes the second output member of the actuating means to cock the shutter.

An important advantage of the motion transmitting lever 16 is that it disengages the scanning portion 9b of the feeler 9 from the film 2 when the transport of film by the length of a frame is completed. Another advantage of the lever 16 is that it causes the scanning portion 9b to bear against and to tension and arrest the backing paper 3 during the making of exposures; the backing paper is then incapable of displacing the film while the shutter admits scene light.

The lever 16 may consist of sheet metal and can be mass produced by stamping or the like. It is also possible to mass-produce the lever 16 from a suitable synthetic plastic substance.

The film transporting mechanism is already described in applicant's-U.S. patent application Ser. No. 314,277.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus for use with roll film having a row of perforations of predetermined length, one for each film frame, and with a web of backing paper for the film, a combination comprising film transporting means operable to advance the film and backing paper along a predetermined path; a movable feeler device having a scanning portion adjacent to said path opposite the backing paper and being in register with the row of perforations, the width of said scanning portion as considered in the direction of film movement along said path being less than said predetermined length; biasing means for urging said scanning portion against the film in said path so that said scanning portion enters an oncoming perforation during transport of the film and is thereupon entrained by the moving film; control means movable between first and second positions in which said control means respectively permits and effects an interruption of the transport of film along said path; and a displaceable motion transmitting device arranged to receive motion from said feeler device while said scanning portion is being entrained by the film in said path and to thereby effect the movement of said control means from said first to said second position as well as to displace said scanning portion in the adjacent perforation so that said scanning portion extends with clearance through the adjacent perforation and bears against the backing paper in said path.

2. A combination as defined in claim 1, wherein said feeler device is movable relative to said motion transmitting device between a first position which said feeler device assumes in response to penetration of said scanning portion into an oncoming perforation of the film in said path and a second position which said feeler device assumes upon entrainment of said scanning portion by the moving film.

3. A combination as defined in claim 1 wherein said motion transmitting device comprises a lever which is pivotable about a predetermined axis and further comprising means for biasing said lever against said feeler device.

4. A combination as defined in claim 2, further comprising means for releasably holding said feeler device in each of said positions relative to said motion transmitting device.

5. A combination as defined in claim 4, wherein said means for releasably holding comprises a pair of notches provided in one of said devices and follower means provided on the other of said devices, said follower means being received in one of said notches in the first position and in the other of said notches in the second position of said feeler device relative to said motion transmitting device.

6. A combination as defined in claim 5, wherein the depth of one of said notches exceeds the depth of the other of said notches and said one device further comprises a cam face which is tracked by said follower means during movement of said feeler device relative to said motion transmitting device.

7. A combination as defined in claim 6, wherein said cam face is configured to displace said scanning portion in the adjacent perforation during movement of said feeler device from said first to said second position relative to said motion transmitting device, said motion transmitting device comprising a portion which is caused to engage said control means while said follower means tracks said cam face and to thereby effect the movement of said control means from said first to said second position.

8. A combination as defined in claim 1, further comprising stationary pivot means for said feeler device, said feeler device having a slot for said pivot means and being pivotable on and movable transversely of said pivot means.

9. A combination as defined in claim 8, wherein said biasing means is arranged to pivot said feeler device on said pivot means.

10. A combination as defined in claim 1, wherein said control means comprises a lever which is pivotable between said first and second positions about a fixed axis, and further comprising means for biasing said lever to said first position, said lever having a first arm cooperating with said film transporting means and a second arm receiving motion from said motion transmitting device.

11. A combination as defined in claim 10, wherein said motion transmitting device comprises a second lever having an arm which engages and pivots said second arm of said first mentioned lever in response to entrainment of said scanning portion by the film in said path.

* * * * *